(12) United States Patent
Utagaki et al.

(10) Patent No.: US 7,972,433 B2
(45) Date of Patent: *Jul. 5, 2011

(54) FIBER REINFORCED CEMENT COMPOSITION AND PRODUCTS AND MANUFACTURING PROCESS

(75) Inventors: Kazuo Utagaki, Nagoya (JP); Tadashi Sugita, Nagoya (JP); Satoshi Takayama, Nagoya (JP)

(73) Assignee: Nichiha Co., Ltd., Nagoya-Shi (JP)

( * ) Notice: Subject to any disclaimer, the term of this patent is extended or adjusted under 35 U.S.C. 154(b) by 1072 days.

This patent is subject to a terminal disclaimer.

(21) Appl. No.: 11/645,801

(22) Filed: Dec. 27, 2006

(65) Prior Publication Data

US 2008/0157428 A1    Jul. 3, 2008

(51) Int. Cl.
C04B 16/02    (2006.01)
C04B 24/02    (2006.01)

(52) U.S. Cl. .................................. 106/713; 106/737

(58) Field of Classification Search ............ 106/713, 106/737
See application file for complete search history.

(56) References Cited

U.S. PATENT DOCUMENTS

| | | | |
|---|---|---|---|
| 3,841,885 A | 10/1974 | Jakei | |
| 3,972,972 A | 8/1976 | Yano et al. | |
| 4,101,335 A * | 7/1978 | Barrable | 106/644 |
| 4,985,119 A | 1/1991 | Vinson et al. | |
| 5,188,889 A | 2/1993 | Nagatomi et al. | |
| 5,804,003 A | 9/1998 | Nishizawa | |
| 5,858,083 A | 1/1999 | Stav et al. | |
| 5,945,044 A * | 8/1999 | Kawai et al. | 264/37.29 |
| 6,001,169 A | 12/1999 | Kawai | |
| 6,138,430 A * | 10/2000 | Van Acoleyen et al. | 52/745.19 |
| 6,506,248 B1 | 1/2003 | Duselis et al. | |
| 6,572,697 B2 * | 6/2003 | Gleeson et al. | 106/705 |
| 6,605,148 B2 | 8/2003 | Shirakawa et al. | |
| 6,676,745 B2 | 1/2004 | Merkley et al. | |
| 6,872,246 B2 | 3/2005 | Merkley et al. | |
| 7,344,593 B2 | 3/2008 | Luo et al. | |
| 7,621,087 B2 | 11/2009 | Utagaki et al. | |
| 2001/0047741 A1 | 12/2001 | Gleeson et al. | |
| 2003/0205172 A1 * | 11/2003 | Gleeson et al. | 106/679 |
| 2004/0168615 A1 | 9/2004 | Luo et al. | |
| 2005/0235883 A1 | 10/2005 | Merkley et al. | |
| 2006/0043627 A1 | 3/2006 | Sugita et al. | |
| 2007/0186822 A1 | 8/2007 | Utagaki et al. | |
| 2007/0245930 A1 | 10/2007 | Utagaki et al. | |
| 2007/0246864 A1 | 10/2007 | Utagaki et al. | |
| 2007/0261607 A1 | 11/2007 | Utagaki et al. | |
| 2007/0277472 A1 * | 12/2007 | Sinclair | 52/605 |
| 2008/0072795 A1 | 3/2008 | Utagaki et al. | |
| 2008/0072796 A1 | 3/2008 | Utagaki et al. | |
| 2008/0072797 A1 | 3/2008 | Utagaki et al. | |
| 2008/0148999 A1 | 6/2008 | Luo et al. | |
| 2008/0203365 A1 | 8/2008 | Gleeson et al. | |

FOREIGN PATENT DOCUMENTS

| | | |
|---|---|---|
| JP | 49-45934 A | 5/1974 |
| JP | 49-45935 A | 5/1974 |
| JP | 54-99131 A | 8/1979 |
| JP | 58-110443 A | 7/1983 |
| JP | 58110443 A | 7/1983 |
| JP | 1-242452 A | 9/1989 |
| JP | 1-320243 | 12/1989 |
| JP | 3-97644 A | 4/1991 |
| JP | 3-257052 A | 11/1991 |
| JP | 4-042875 A | 2/1992 |
| JP | 4042875 A | 2/1992 |
| JP | 4-114937 A | 4/1992 |
| JP | 4114937 A | 4/1992 |
| JP | 4-160045 A | 6/1992 |
| JP | 4-187552 A | 7/1992 |
| JP | 4-193748 A | 7/1992 |
| JP | 4193748 A | 7/1992 |
| JP | 4-295072 A | 10/1992 |
| JP | 4295072 A | 10/1992 |
| JP | 5-124845 A | 5/1993 |
| JP | 5-229859 A | 9/1993 |
| JP | 5229859 A | 9/1993 |
| JP | 6-32643 A | 2/1994 |
| JP | 6-56496 A | 3/1994 |
| JP | 6-321602 A | 11/1994 |
| JP | 6-329457 A | 11/1994 |
| JP | 7-117027 A | 5/1995 |
| JP | 7-291707 A | 11/1995 |
| JP | 7291707 A | 11/1995 |

(Continued)

OTHER PUBLICATIONS

JP 04305041 abstract Nagata et al. Oct. 28, 1992, abstract can be found in PAIR for issued related U.S. Appl. No. 11/215,964.*
JP 61256956 A abstract only Nov. 14, 1986, abstract can be found in PAIR for issued related U.S. Appl. No. 11/215,964.*
Translation of JP 58-110443A, Jul. 1, 1983.
Translation of JP 8-040758A, Feb. 13, 1996.
Abstract of JP 5-229859A, Sep. 7, 1993.

(Continued)

*Primary Examiner* — Paul Marcantoni
(74) *Attorney, Agent, or Firm* — Birch, Stewart, Kolasch & Birch, LLP

(57) ABSTRACT

The problems to be solved by the invention are to provide a fiber reinforced cement composition for obtaining a fiber reinforced cement product which is excellent in bending strength, dimensional stability and installing property such as handling property, flexibility performance and nail performance, as well as a process for manufacturing the product.
Namely, the fiber reinforced cement composition comprises the following raw materials: a hydraulic inorganic material, a siliceous material and a woody reinforcement, wherein the siliceous material is an inorganic hollow material and/or an inorganic spherical material and a finely dividing inorganic hollow material and/or a finely dividing inorganic spherical material.
The effects of the present invention, it is possible to obtain a fiber reinforced cement product having good bending strength, dimensional stability and installing property such as handling property, flexibility performance and nail performance.

18 Claims, No Drawings

FOREIGN PATENT DOCUMENTS

| | | | |
|---|---|---|---|
| JP | 8-040758 | A | 2/1996 |
| JP | 8040758 | A | 2/1996 |
| JP | 9-87001 | A | 3/1997 |
| JP | 10-231161 | A | 9/1998 |
| JP | 2888629 | B2 | 2/1999 |
| JP | 11-322395 | A | 11/1999 |
| JP | 3024236 | B2 | 1/2000 |
| JP | 3040144 | B2 | 3/2000 |
| JP | 2000-264701 | | 9/2000 |
| JP | 2001-158678 | A | 6/2001 |
| JP | 2001-233653 | A | 8/2001 |
| JP | 2001-287980 | A | 10/2001 |
| JP | 2002-166406 | A | 6/2002 |
| JP | 3374515 | | 11/2002 |
| JP | 2003-146731 | A | 5/2003 |
| JP | 2004-196601 | A | 7/2004 |
| WO | WO 2006/025331 | A1 | 3/2006 |

OTHER PUBLICATIONS

Abstract of JP 4-295072A, Oct. 20, 1992.
Abstract of JP 7-291707A, Nov. 7, 1995.
Translation of JP 4-193748A, Jul. 13, 1992.
Abstract of JP 4-114937A, Apr. 15, 1992.
Abstract of JP 4-042875A, Feb. 13, 1992.
Japanese Office Action issued on Jan. 12, 2010 in related JP Application No. 2004-251708.
Third-Party Submission document filed on Jan. 4, 2010 in related Japanese Patent Application No. 2004-251708.
Third-Party Submission document filed on Jan. 5, 2010 in related Japanese Patent Application No. 2004-251706.
Third-Party Submission document filed on Jan. 5, 2010 in related Japanese Patent Application No. 2004-251707.
Third-Party Submission Notice issued on Jan. 28, 2010 in related Japanese Patent Application No. 2004-251708.
Third-Party Submission Notice issued on Jan. 29, 2010 in related Japanese Patent Application No. 2004-251706.
Third-Party Submission Notice issued on Jan. 29, 2010 in related Japanese Patent Application No. 2004-251707.

* cited by examiner

FIBER REINFORCED CEMENT COMPOSITION AND PRODUCTS AND MANUFACTURING PROCESS

CROSS-REFERENCE TO RELATED APPLICATION

PCT/JP2005/015667
U.S. patent application Ser. No. 11/215,964
U.S. patent application Ser. No. 11/354,241
U.S. patent application Ser. No. 11/410,311
U.S. patent application Ser. No. 11/431,652
U.S. patent application Ser. No. 11/527,712
U.S. patent application Ser. No. 11/527,715

BACKGROUND OF THE INVENTION

1. Field of the Invention

The present invention relates to a fiber reinforced cement composition using a hydraulic inorganic material such as cement, products thereof and a manufacturing process thereof.

2. Description of the Related Art

The following description sets forth the inventor's knowledge of related art and problems therein and should not be construed as an admission of knowledge in the prior art.

Hitherto, for manufacturing process of fiber reinforced cement product using a hydraulic inorganic material such as cement, when the specific gravity of fiber reinforced cement product is high by adding a lot of powder, freezing and fusion resistance and bending strength improve basically.

But, if the product is hard by high specific gravity thereof, there is a problem in installing property such as nail performance.

And, for reason to improve of physical properties, about powder material, addition of various lightweight aggregates is examined.

For example, in Japanese Patent No. 3374515, it is disclosed that the amount of not less than 5% by mass and not more than 30% by mass of vermiculite adds in cementitious molding composition.

In Japanese unexamined laid open patent publication No. 2000-264701, it is disclosed that wood fiber which specified average fiber length and average width of fiber adds in matrix, furthermore, the amount of not less than 18% by mass and not more than 60% by mass of expanded inorganic material such as expanded perlite adds in matrix.

And, in Japanese patent Publication No. H08-32603, it is disclosed that lightweight cementitious molding composition for extrusion comprising cement, lightweight aggregate, inorganic aggregate, organic fiber, additive of cellulose type, in which lightweight aggregate is fly ash which has average particle size of not more than 2 mm, has a bulk specific gravity of not less than 0.1 and not more than 0.4, and inorganic aggregate comprising (A) and (B), in which inorganic aggregate (A) is spherical aggregate which has a particle size of not less than 1 μm and not more than 100 μm selected out of fly ash and spherical calcium silicate hydrates, in which inorganic aggregate (B) is a ultra-fine particle aggregate which has a particle size of not less than 0.01 μm and not more than 0.5 μm selected out of micro-silica, silica fume, natural pozzolan, diatomaceous earth, silica flower, aerosol.

Here, a lightweight cementitious composition is for extrusion, and lightweight aggregate and inorganic aggregate are quite spherical, because it is to get reduction of extrusion pressure of an extrusion and fluency of an extrusion.

However, in not extrusion that is wet forming such as Hatschek process and flow on process, it mixes raw materials with water, and it makes a slurry of raw materials flow down on a felt, and it is aspirated from under the felt and it dehydrates, there is danger that lightweight aggregate, particularly, hollow lightweight aggregate rise from the slurry in forming process and gather in the surface side, and there is danger that unevenness occurs to specific gravity of products, and there is danger that delamination occurs when a green sheet is rolled up around a making roll.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

Under such circumstances, the problems to be solved by the invention are to provide a fiber reinforced cement composition for obtaining a fiber reinforced cement product which is excellent in bending strength, dimensional stability and installing property such as handling property, flexibility performance and nail performance, and not unevenness of specific gravity, as well as a process for manufacturing the product.

The present invention provides, as a means to solve the conventional problems, a fiber reinforced cement composition comprising the following raw materials: a hydraulic inorganic material, a siliceous material and a woody reinforcement, wherein the siliceous material is an inorganic hollow material and/or an inorganic spherical material and a finely dividing inorganic hollow material and/or a finely dividing inorganic spherical material.

The effects of the present invention, it is possible to obtain a fiber reinforced cement product having good bending strength, dimensional stability and installing property such as handling property, flexibility performance and nail performance, and it is no problem for forming process.

The above and/or other aspects, features and/or advantages of various embodiments will be further appreciated in view of the following description. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

DETAILED DESCRIPTION OF THE INVENTION

The present invention will be explained in detail below.

At first, each of the raw materials used for the fiber reinforced cement composition is explained below.

[Hydraulic Inorganic Material]

A hydraulic inorganic material refers to a material which causes a hydration reaction upon contact with water to initiate hardening and includes cement and lime.

Among them, it is preferred to use portland cement as the hydraulic inorganic material in the present invention.

The portland cement includes ordinary portland cement, high early strength portland cement, ultra high early portland cement, moderate heat portland cement and sulfate resistant portland cement (according to ASTM (American Society for Testing and Materials international) C150, Standard Specification for Portland cement Type I, Type II, Type III, Type IV and Type V) are included.

Amongst, ordinary portland cement (according to ASTM C150, Type I, Type II or a blend thereof, and according to AASHTO (American Association of State Highway and Transportation Officials) M85, Type I) is inexpensive and is for the use.

[Siliceous Material]

A siliceous material refers to a material which contains silica ($SiO_2$) as a chemical component.

In the present invention, examples of the siliceous material include silica sand, silica powder, diatomaceous earth, silica fume, fly ash, expanded perlite, blast furnace slag, steel slag and sodium silicate.

It is preferable in the present invention to use an inorganic hollow material and/or an inorganic spherical material which contain silica and a finely dividing inorganic hollow material and/or a finely dividing inorganic spherical material which contain silica.

Here, "the inorganic hollow material" is a material which contains air in an inorganic husk.

Concretely, it is senosphere included in fly ash, and it is expanded perlite and shirasu balloon which burned and foamed from inorganic aggregate, and it is pumice including air naturally.

It is not necessary to be a complete hollowness (It means that air space closing completely by husk).

The finely dividing inorganic hollow material is finely divided the inorganic hollow material.

Here, "the inorganic spherical material" is a material which shape of inorganic husk is quite sphere.

Concretely, it is fly ash and shirasu balloon.

Expanded perlite is considerably distorted, but it is spherical shape when it was classified with the spherical shape or squamous shape or square-built shape.

The finely dividing inorganic spherical material is finely divided the inorganic spherical material.

It is possible to make lightweight by the hollowness and to cause calcium silicate reaction by silica by using the inorganic hollow material.

Furthermore, it is possible to prevent the hollow inorganic material from rising to surface of green sheet in after-mentioned forming process by using the finely dividing inorganic hollow material, and it is possible to supply the silica component that it is necessary for calcium silicate reaction.

In addition, it is possible to improve fluidity of raw materials by using the inorganic spherical material, and it is dispersed by uniformly.

Furthermore, it is possible to prevent deflection to one direction of the inorganic spherical material in after-mentioned forming process by using the finely dividing inorganic spherical material, and it is possible to supply the silica component that it is necessary for calcium silicate reaction.

Here, it is preferable that an average particle size of the inorganic hollow material is not less than 50 μm and not more than 300 μm, and it is preferable that an average particle size of the inorganic spherical material is not less than 15 μm and not more than 50 μm.

And it is preferable that an average particle size of the finely dividing inorganic hollow material and/or the finely dividing inorganic spherical material is not less than 1 μm and not more than 15 μm.

If the average particle size of the inorganic hollow material is less than 50 μm, there is danger that the lightweight effect deteriorates, and if the average particle size of the inorganic hollow material is more than 300 μm, there is danger that the formability of product deteriorates.

If the average particle size of the inorganic spherical material is less than 15 μm, there is danger that the fluidity of slurry deteriorates, and if the average particle size of the inorganic spherical material is more than 50 μm, there is danger that the surface characteristics of product deteriorates.

If the average particle size of the finely dividing inorganic hollow material and/or the finely dividing inorganic spherical material is less than 1 μm, there is danger that installing property turns worse, and if the average particle size of the finely dividing inorganic hollow material and/or the finely dividing inorganic spherical material is more than 15 μm, there is danger that the reactivity is not increased.

Particularly, it is preferable in the present invention to use expanded perlite as the inorganic hollow material, and to use fly ash as the inorganic spherical material.

Because shape of expanded perlite is hollowness, and in addition, there is smaller hollowness in hollowness, a resulting product is lightweight and nail performance thereof is superior.

Expanded perlite is composed mainly of glassy substances and the siliceous content thereof is as high as about 80% by mass.

If it is divided for use, expanded perlite can be used enough as silica component of calcium silicate reaction.

When fly ash is used as the siliceous material, while fly ash is very inexpensive and thus economical and, in addition, the resulting product such as an external wall board is excellent in nail performance.

It is preferable that fly ash contains not less than 50% by mass and not more than 70% by mass of $SiO_2$ component.

Thus, it is preferable to use fly ash of Type F of ASTM C618. (Type F contains not less than 70% by mass of $SiO_2+Al_2O_3+Fe_2O_3$ component.)

It is preferable in the present invention that the silica in the siliceous material is amorphous.

This is because a possibility of adverse effects (such as pneumoconiosis) of crystalline silica on a human body has been pointed out, just like asbestos cases.

It is possible to judge whether or not silica is crystalline by the appearance of the crystalline peaks of crystalline silica contained in quartz, tridymite or cristobalite by an X-ray diffraction.

Namely, quartz or the like is crystalline and thus if the peaks of quartz or the like are observed in a siliceous material, the silica component contained in the siliceous material is crystalline rather than amorphous.

Accordingly, such a siliceous material in which the peaks observed in quartz or the like in an X-ray diffraction are not observed is used in the present invention.

Fly ash contains some amount of crystalline silica depending on the type (about 10% by mass of quartz).

However, crystalline silica contained in the fly ash is converted to calcium silicate hydrates by calcium silicate reaction in an autoclave and crystalline silica decreases.

In addition by finely dividing fly ash into an average particle size of not more than 15 μm, the reactivity thereof is enhanced and thus a major part of the trace amount of crystalline silica contained in fly ash is converted to calcium silicate hydrates via curing in an autoclave and the crystalline silica almost disappears.

Thus, by using finely divided fly ash, it is possible to eliminate, subsequent to asbestos, a recent concern about the problem of health (such as oncogenesis) caused by crystalline silica.

Expanded perlite is amorphous material and not contained crystalline silica, and there is not problem of health.

Furthermore, for strength improvement and/or specific gravity setting, the other amorphous silica such as silica fume and blast furnace slag and glass powder may be used as the siliceous material.

[Woody Reinforcement]

Examples of the woody reinforcement include woody pulp, wood fiber bundle, wood fiber, wood flake, wood wool and wood powder.

It is preferable to use woody pulp, more preferably needle-leaves-tree unbleached kraft pulp (NUKP), needle-leaves-tree bleached kraft pulp (NBKP), Laubholz unbleached kraft pulp (LUKP) and Laubholz bleached kraft pulp (LBKP), and particularly preferably needle-leaves tree pulps such as NUKP and NBKP.

It is preferable to set the freeness of pulp, i.e. the value measured according to Canadian standard measurement (Canadian standard freeness, hereinafter, referred to as CSF), which varies depending on the degree of beating of pulp, to be not more than 500 ml.

By using such a woody reinforcement of fine fibers, the woody reinforcement exists in a cementitious (powdery) matrix in a high density to give a fiber reinforced cement product having an excellent toughness.

Furthermore, it is possible to reduce the cost by using additionally used paper as the woody reinforcement.

It is preferable to use used newspapers or corrugated cardboards as the used paper.

By adding the used paper in an appropriate amount, mixing property with cement powder is enhanced, thereby providing a fiber cement product excellent in handling property and nail performance.

It is preferable to use such the used paper having a fiber length of not less than 0.5 mm and not more than 3.0 mm, a fiber diameter of not less than 10 μm and not more than 100 μm, and a CSF of not more than 350 ml.

It is also preferable to use two kinds of woody reinforcement in a ratio of NUKP (NBKP) to used paper in a range of from 4:1 to 1:1.

If the ratio of the used paper to NUKP (NBKP) is more than 1:1, the resulting product contains a small amount of long fibers and thus becomes difficult to develop strength, whereas if the ratio of the NUKP (NBKP) to the used paper is more than 4:1, mixing with cement (powder) becomes difficult.

A woody reinforcement having a CSF of not less than 500 ml may be added as an auxiliary material.

[Mica]

Mica contributes to improvement in the dimensional stability of the product since it usually has a lamellar structure, is not hygroscopic and is a high elastic substance having a rigidity.

For example, if a fiber reinforced cement product without mica contains 15 to 18% by mass of water when it is sold, the size of the product tends to shrink as the water content thereof decreases upon natural evaporation of the internal water under environmental conditions.

However, if a fiber reinforced cement product contains mica, the dimensional change is reduced.

The mica used in the present invention is preferably in the form of flakes having an average particle size of not less than 200 μm and not more than 700 μm, and an aspect ratio of not less than 60 and not more than 100.

Incidentally, the aspect ratio herein means the ratio of thickness relative to particle size.

[Water-Soluble Resin]

Examples of a water-soluble resin include polyvinyl alcohols, carboxymethyl cellulose, methyl cellulose, polyethylene oxides and polyvinyl ethers.

The water-soluble resin serves as a binder in the fiber reinforced cement product, enhances adhesion between the layers of the components contained in the product, and improves the bending strength, as well as freezing and fusion resistance of the product.

In addition, since the water-soluble resin has a water-retention action, it prevents the surface of the fiber reinforced cement product from drying in the course of autoclave curing and acts to uniform the water content, thereby achieving a uniform hardening-curing reaction.

A desirable water-soluble resin is a powdery polyvinyl alcohol resin having a saponification value of not less than 98% by mol.

Incidentally, the term "saponification value" means a percentage of the number of hydroxyl group relative to the total number of acetate group and hydroxyl group contained in a polyvinyl alcohol resin in a saponification reaction (a reaction to synthesize a polyvinyl alcohol resin by substituting the acetate group in a polyvinyl acetate with hydroxyl group).

A powdery polyvinyl alcohol resin having a saponification value of not less than 98% by mol is not soluble in water but merely swells at a normal temperature, and thus does not dissolve in the water of an aqueous slurry of raw materials at a normal temperature.

Therefore, in the after-mentioned forming process of slurry, outflow of the polyvinyl alcohol resin is reduced, whereby the yield of process does not lower, and the viscosity of the slurry does not raised, whereby the forming efficacy does not lower.

In the green sheet prepared by forming the slurry of raw materials, the powdery polyvinyl alcohol resin comes to dissolve in the water contained in the green sheet owing to the high temperature in an autoclave curing process.

Because the water content of the green sheet is low, a major part of the powdery polyvinyl alcohol resin remains in the green sheet in a state of balloon in which the powdery polyvinyl alcohol resin is dissolved in water and a large amount of the polyvinyl alcohol resin in the state of balloon exists in a final product, i.e. a fiber reinforced cement product.

Thus, the product is provided with a cushioning property due to the effect of the shape of balloon, whereby the internal stress which generates during freezing and fusion is absorbed and alleviated to enhance freezing and fusion resistance.

In addition, when a water-soluble resin is added, the water-soluble resin coats the surface of the particles of cement as a protecting colloid, which possibly affects the hydration reaction of the cement.

However, when a powdery polyvinyl alcohol resin is used, a major part of the resin remains in a state of balloon in the green sheet.

Thus it becomes difficult to coat the cement particles with the polyvinyl alcohol resin as a protecting colloid, whereby the effect of the resin on the hydration reaction of the cement is reduced.

[Other Component]

As the other component, the following components may be optionally added: mineral powders such as vermiculite, bentonite and dolomite; inorganic fibers such as wollastonite and glass fiber; organic fibers such as polypropylene fiber, acrylic fiber and aramid fiber; cement setting accelerators such as sodium aluminate, calcium formate, potassium sulfate, calcium sulfate, aluminum sulfate and calcium acetate; water-repellants or water-proofing agents such as wax, paraffin, silicone, succinic acid and surfactants; and inorganic lightweight materials such as pulverized woody cement products and inorganic products.

Incidentally, these illustrations do not restrict the present invention.

[Raw Material Composition of the Fiber Reinforced Composition]

The fiber reinforced cement composition is preferably composed of the following raw materials: not less than 25% by mass and not more than 45% by mass of the hydraulic inorganic material, not less than 50% by mass and not more than 65% by mass of the siliceous materials, not less than 5% by mass and not more than 12% by mass of the woody reinforcement, and not less than 1% by mass and not more than 7% by mass of mica, and not less than 0.25% by mass and not more than 1.5% by mass of the water-soluble resin.

If the amount of the hydraulic inorganic material is less than 25% by mass, development of the strength after first hardening in not sufficient, whereas if it is more than 45% by mass, the resulting fiber reinforced cement product becomes rigid and fragile.

If the amount of the siliceous material is less than 50% by mass, a siliceous component which reacts in a calcium silicate reaction is not enough, whereas if it is more than 65% by mass, a calcium component is not enough to leave an unreacted siliceous component.

If the amount of the woody reinforcement is less than 5% by mass, a problem with regard to toughness of the resulting fiber reinforced cement product occurs, whereas if it is more than 12% by mass, uniform dispersion thereof in the raw materials becomes difficult.

If the amount of mica is less than 1% by mass, it does not contribute to the dimensional stability of the resulting fiber reinforced cement product, whereas if it is more than 7% by mass, uniform dispersion thereof in the raw materials becomes difficult.

If the amount of the water-soluble resin is less than 0.25% by mass, it does not contribute to the development of strength, whereas if it is more than 1.5% by mass, improvement in the physical properties of the resulting product is not achieved.

A preferable mass ratio is obtained by using as the hydraulic inorganic material not less than 28% by mass and not more than 32% by mass of portland cement, and as the siliceous material not less than 54% by mass and not more than 58% by mass in total of fly ash which is an average particle size of not less than 15 μm and not more than 50 μm and/or expanded perlite which is an average particle size of not less than 50 μm and not more than 300 μm and finely dividing fly ash and/or finely dividing expanded perlite which is an average particle size of not less than 1 μm and not more than 15 μm, wherein the amount of finely dividing fly ash and/or finely dividing expanded perlite which is an average particle size of not less than 1 μm and not more than 15 μm is not less than 25% by mass and not more than 75% by mass of the whole siliceous material consisting of fly ash and/or expanded perlite and finely dividing fly ash and/or finely dividing expanded perlite, and as the woody reinforcement not less than 8% by mass and not more than 12% by mass in total NUKP and/or NBKP and the used paper, wherein the amount of the used paper is not less than 20% by mass and not more than 50% by mass of the whole woody reinforcement consisting of NUKP and/or NBKP and the used paper, and as mica is not less than 2% by mass and not more than 5% by mass, and as the water-soluble resin is not less than 0.5% by mass and not more than 1.25% by mass.

In this case, it is preferable that the mass ratio of CaO to $SiO_2$ in the raw materials consisting of the hydraulic inorganic material and the siliceous material is in a range of from 23:77 to 40:60.

It is possible to set this mass ratio by analyzing the chemical composition each of the hydraulic inorganic material and the siliceous material.

[Manufacturing Process]

In a process for manufacturing a fiber reinforced cement product, the above-mentioned composition is mixed with water to give a slurry of raw materials.

The concentration of the slurry is in a range of from 3 to 15% by mass reduced to a concentration of solid content.

The slurry of raw materials is manufactured by a wet manufacturing process.

Examples of the wet manufacturing processes include Hatschek process, flow on process, filter pressing process, roll forming, extrusion, injection, Mazza pipe process, Magnani sheet process, hand lay-up process, molding and casting. Flow on process is employed for forming herein.

Namely, the "flow on process" is a process in which a slurry of raw materials is flow down on an endless felt provided with a suction unit below the felt and formed with suction-dehydration to give a green sheet (i.e. a soft wet sheet), and the green sheet is rolled up around a making roll to give a multi-layer sheet, and when the thickness of the multi-layer sheet reaches a predetermined thickness, the sheet is separated from the making roll to give a green mat.

The number of rolling around the making roll is preferably 6 to 15.

Then, the green mat is pressed with a pressure of 2 to 5 MPa.

Incidentally, the green sheet is rolled up around the making roll in layers in Hatschek process like in flow on process.

In the Hatschek process, forming speed is fast, and as the speed increases, the fibers are more readily orientated and the aspect ratio (length/breadth ratio) of the bending strength increases.

On the other hand, in the flow on process in which raw materials are flown down on the felt, fibers are not so readily orientated as in the Hatschek process, and thus the aspect ratio of the bending strength is not so increased as in the Hatschek process.

In addition, since plural butts each accommodating a cylinder are provided and a felt is run on the cylinders in the butts to transfer the slurry of raw materials to the felt in the Hatschek process, the green sheet which has been formed and dehydrated on the felt and rolled up around the making roll produces a laminar structure having the number of layers equivanlent to the number of the butts, and has a freezing and fusion resistance inferior to that of a green sheet obtained by the flow on process.

On the contrary, when the flow on process is employed, the resulting green sheet itself does not have laminar structure but the resulting green mat has a laminar structure having the number of layers equivalent to the number of rolling up around the making roll, and thus the resulting mat has s freezing and fusion resistance better than of the green mat obtained by Hatschek process.

Furthermore, in the Hatschek process, a felt is run on the cylinders in the butts to transfer the slurry of raw materials to the felt, and thus it is necessary to increase the number of the butt to increase the thickness of the resulting fiber reinforced cement product.

This is very uneconomical.

On the other hand, in the flow on process, since the thickness of the product can be increased readily by increasing the amount of the slurry of raw materials to be flown down on the felt, the flow on process is economical.

In addition, the bulk of the product can be increased prior to pressing in this process, whereby deep embosses can be formed on the green mat.

Therefore, it is preferable to adopt the flow on process.

In forming of this flow on process, it makes material slurry flow down on a felt, and it is aspirated from under the felt, and it dehydrates.

And, the green sheet is made on the felt from a place of flow on to a place of rolling up by a making roll.

Therefore, when an inorganic hollow material is used as lightweight aggregate, the inorganic hollow material is rised from slurry, and there is danger that the inorganic hollow material gather in the surface side which is reverse to the felt side.

So, there is danger that unevenness occurs to specific gravity of products, and there is danger that delamination occurs when a green sheet is rolled up around a making roll.

However, it is possible to evade such a danger by using an inorganic hollow material and a finely dividing inorganic hollow material as siliceous material like this invention.

If an inorganic hollow material is only used, the inorganic hollow material may be rised to surface side, but it is possible to prevent an inorganic hollow material from rising to the surface side by using the inorganic hollow material which the average particle size is not less than 50 μm and not more than 300 μm and a finely dividing inorganic hollow material which the average particle size is not less than 1 μm and not more than 15 μm and is divided the inorganic hollow material.

In other words, the finely dividing inorganic hollow material which the average particle size is not less than 1 μm and not more than 15 μm and is divided the inorganic hollow material which the average particle size is not less than 50 μm and not more than 300 μm is the state that a husk of a hollow material was broken and became in the shape of a piece without becoming a complete granular state.

Therefore, a slurry of raw materials flows into a part of the piece and a inside of the hollow material that a husk was broken, and the finely dividing inorganic hollow material disperses in the slurry of raw materials uniformly.

Furthermore, it is possible to prevent the inorganic hollow material from rising because there is the dividing inorganic hollow material which is not finely, and a slurry of raw materials flowed into inside in the upper part (the surface side) of the inorganic hollow material.

In addition, it is possible to improve fluidity of a slurry of raw materials by using an inorganic spherical material as aggregate because of the shape when the slurry of raw materials is given on felt in wet forming of a flow on process.

It is happy in wet forming of the flow on process, but when the slurry of raw materials is flowing a little too much and flowing speed becomes considerably fast, there is danger that the inorganic spherical material is deflection because fluidity is too good.

Because a shape of finely dividing inorganic spherical material is not only sphere but also various shape, for example the shape of a piece and powder, a finely dividing inorganic spherical material flows into between inorganic spherical materials by using thereof, therefore, there is no deflection of the inorganic spherical material.

Subsequently, the press molded mat obtained by pressing the green mat is hardened at 40 to 80° C. for 12 to 24 hours and then cured in an autoclave.

Curing in an autoclave is preferably effected by raising the temperature to 150 to 180° C. in 3.5 hours, keeping the temperature for 6.5 hours and lowering the temperature in 6 hours.

Upon autoclave curing under such conditions, a silica component and an alumina component elute from the surface of mica, thereby roughening the surface of mica.

In addition, the calcium component eluted from cement or the like is liable to enter into the space among overlapped parts of mica fragments, and the calcium component reacts with the silica component and some amount of the alumina component both eluted from the surface of mica to produce a stable calcium silicate hydrate in the space among the overlapped parts of mica fragments, thereby firmly adhering the mica fragments.

During the autoclave curing, a kind of tobermorite having a card house structure which has a better crystalline property than that of the other kind of tobermorite is produced in a large amount, whereby the dimensional stability and the freezing and fusion resistance of the product are enhanced.

If the amount of the calcium component is too much relative to the amount of the siliceous component, a cement hydration predominantly occurs rather than a calcium silicate reaction, whereby the resulting fiber reinforced cement product becomes fragile and the crack resistance thereof decreases.

On the contrary, if the amount of the siliceous component is too much relative to the amount of the calcium component, unreacted siliceous component remains in a large amount and the amount of tobermorite produced is decreased, whereby the freezing and fusion resistance of the product lowered.

Because a slurry of raw materials flows into a finely dividing hollow material which is the shape of a piece, and calcium silicate reaction is generated at a part of the piece, tobermorit is produced here, and bonding strength in mat is improved.

[Products]

Application of the fiber reinforced cement composition includes fiber reinforced cement sidings, glass fiber reinforced cement boards, pulp reinforced cement boards, wood fiber reinforced cement calcium silicate boards, fiber reinforced cement calcium silicate boards, slag cement perlite boards and the like, and all of these final products are referred to as fiber reinforced cement products.

[Coating Method]

Coating of the fiber reinforced cement product is effected, for example, by coating with a sealer the front face twice and the ends and the rear face once, applying an undercoating such as an aqueous emulsion-type coating composition of acrylic resin or a coating composition of silicone resin, applying an intermediate coating, and then applying a top coating such as an organic solvent solution-type coating composition of acrylic resin, an aqueous emulsion-type coating composition of acrylic resin or an organic solvent solution-type coating composition of silicone-acrylic resin.

[Installing Method]

As a method for installation of the fiber reinforced cement product of the fiber reinforced cement composition, it is preferable to effect, for example, in the case of fiber reinforced cement sidings, by nailing a first siding at the positions about 20 mm inside from or below the upper edge thereof, placing a second siding on the first siding in such a manner that the lower edge of the second siding overlaps the upper edge of the first siding by not less than 30 mm, and then nailing the second siding at the positions about 20 mm inside from the upper edge thereof according to a so-called lap boarding.

DESCRIPTION OF THE PREFERRED EMBODIMENTS

In the following paragraphs, some preferred embodiments of the invention will be described with reference to the attached drawing by way of example and not limitation.

It should be understood based on this disclosure that various other modifications can be made by those in the art based on these illustrated embodiments.

Embodiment 1

Examples 1-17 and Comparisons 1-15 will be illustrated by Embodiment 1 of the present invention.

Table 1

TABLE 1

| Raw material composition (% by mass) | Example 1 | Example 2 | Example 3 | Example 4 | Example 5 | Example 6 | Example 7 | Example 8 | Example 9 |
|---|---|---|---|---|---|---|---|---|---|
| Portland cement | 30 | 30 | 30 | 30 | 30 | 30 | 30 | 30 | 30 |
| Fly ash | 14 | 28 | 42 | 0 | 0 | 14 | 28 | 42 | 0 |
| Finely dividing fly ash | 42 | 28 | 14 | 0 | 0 | 0 | 0 | 0 | 42 |
| Expanded perlite | 0 | 0 | 0 | 14 | 28 | 0 | 0 | 0 | 14 |
| Finely dividing expanded perlite | 0 | 0 | 0 | 42 | 28 | 42 | 28 | 14 | 0 |
| shirasu balloon | 0 | 0 | 0 | 0 | 0 | 0 | 0 | 0 | 0 |
| Finely dividing shirasu balloon | 0 | 0 | 0 | 0 | 0 | 0 | 0 | 0 | 0 |
| NUKP | 8 | 0 | 4 | 8 | 8 | 8 | 8 | 8 | 8 |
| NBKP | 0 | 8 | 4 | 0 | 0 | 0 | 0 | 0 | 0 |
| Used newspaper | 2 | 2 | 2 | 2 | 2 | 2 | 2 | 2 | 2 |
| Mica | 3 | 3 | 3 | 3 | 3 | 3 | 3 | 3 | 3 |
| Polyvinyl alcohol resin | 1 | 1 | 1 | 1 | 1 | 1 | 1 | 1 | 1 |

| Raw material composition (% by mass) | Example 10 | Example 11 | Example 12 | Example 13 | Example 14 | Example 15 | Example 16 | Example 17 |
|---|---|---|---|---|---|---|---|---|
| Portland cement | 30 | 30 | 30 | 30 | 30 | 30 | 30 | 30 |
| Fly ash | 0 | 14 | 28 | 42 | 0 | 0 | 14 | 14 |
| Finely dividing fly ash | 28 | 0 | 0 | 0 | 42 | 28 | 28 | 0 |
| Expanded perlite | 28 | 0 | 0 | 0 | 0 | 0 | 14 | 14 |
| Finely dividing expanded perlite | 0 | 0 | 0 | 0 | 0 | 0 | 0 | 28 |
| shirasu balloon | 0 | 0 | 0 | 0 | 14 | 28 | 0 | 0 |
| Finely dividing shirasu balloon | 0 | 42 | 28 | 14 | 0 | 0 | 0 | 0 |
| NUKP | 8 | 8 | 8 | 8 | 8 | 8 | 8 | 8 |
| NBKP | 0 | 0 | 0 | 0 | 0 | 0 | 0 | 0 |
| Used newspaper | 2 | 2 | 2 | 2 | 2 | 2 | 2 | 2 |
| Mica | 3 | 3 | 3 | 3 | 3 | 3 | 3 | 3 |
| Polyvinyl alcohol resin | 1 | 1 | 1 | 1 | 1 | 1 | 1 | 1 |

Table 1 shows the compositions of the raw materials used in Examples 1 to 17 according to the present invention.

The raw materials are mixed in the composition shown in the table, and water is added thereto to give the slurry of raw materials having a solid concentration of 10% by mass.

The slurry is caused to flow down on a felt and formed with dehydration to give a green sheet.

The green sheet is rolled up around a making roll to give a multilayer structure.

When the thickness of the sheet reaches a predetermined value, the sheet is separated from the making roll to give a green mat.

The mat is pressed with a pressure of 5 MPa, hardened and cured at 80° C. for 15 hours, and further cured in an autoclave at 170° C. for 7 hours to provide a fiber reinforced cement product.

Table 2

Table 2 shows physical properties of the products of Examples 1 to 17 according to the present invention.

TABLE 2

| Physical property | Example 1 | Example 2 | Example 3 | Example 4 | Example 5 | Example 6 | Example 7 | Example 8 | Example 9 |
|---|---|---|---|---|---|---|---|---|---|
| Absolute dry specific gravity | 1.25 | 1.23 | 1.20 | 1.27 | 1.24 | 1.26 | 1.23 | 1.20 | 1.25 |
| Young's modulus (kN/mm$^2$) | 6.7 | 4.9 | 4.1 | 7.4 | 5.3 | 7.1 | 5.0 | 4.4 | 6.8 |
| Bending strength (N/mm$^2$) | 21.3 | 19.7 | 18.2 | 21.8 | 20.6 | 21.4 | 20.3 | 19 | 21.4 |
| Elongation ratio through water absorption (%) | 0.11 | 0.12 | 0.13 | 0.10 | 0.11 | 0.10 | 0.12 | 0.13 | 0.11 |
| Contraction ratio through moisture effusion (%) | 0.12 | 0.13 | 0.14 | 0.11 | 0.12 | 0.11 | 0.13 | 0.14 | 0.12 |
| Microcracking test (cycle) | 8 | 10 | 10 | 8 | 10 | 8 | 10 | 10 | 8 |
| Freezing and fusion resistance (%) | 0.9 | 1.5 | 1.8 | 0.5 | 1.1 | 0.8 | 1.4 | 1.8 | 0.8 |
| Nail performance | ◯ | ◯ | ◯ | ◯ | ◯ | ◯ | ◯ | ◯ | ◯ |
| Presence or absence of crystalline silica | Scarcely present | Scarcely present | Scarcely present | Not present | Not present | Scarcely present | Scarcely present | Scarcely present | Scarcely present |

| Physical property | Example 10 | Example 11 | Example 12 | Example 13 | Example 14 | Example 15 | Example 16 | Example 17 |
|---|---|---|---|---|---|---|---|---|
| Absolute dry specific gravity | 1.23 | 1.25 | 1.23 | 1.20 | 1.25 | 1.23 | 1.23 | 1.24 |
| Young's modulus (kN/mm$^2$) | 5.0 | 7.1 | 5.2 | 4.5 | 7.2 | 5.1 | 4.9 | 5.2 |
| Bending strength (N/mm$^2$) | 19.9 | 21.5 | 20.4 | 19.2 | 21.5 | 20.0 | 19.8 | 20.5 |

TABLE 2-continued

| | | | | | | | | |
|---|---|---|---|---|---|---|---|---|
| Elongation ratio through water absorption (%) | 0.12 | 0.11 | 0.12 | 0.13 | 0.11 | 0.12 | 0.12 | 0.11 |
| Contraction ratio through moisture effusion (%) | 0.13 | 0.12 | 0.13 | 0.14 | 0.12 | 0.13 | 0.13 | 0.12 |
| Microcracking test (cycle) | 10 | 8 | 10 | 10 | 8 | 10 | 10 | 10 |
| Freezing and fusion resistance (%) | 1.2 | 0.8 | 1.1 | 1.7 | 0.8 | 1.2 | 1.4 | 1.2 |
| Nail performance | ◯ | ◯ | ◯ | ◯ | ◯ | ◯ | ◯ | ◯ |
| Presence or absence of crystalline silica | Scarcely present | Scarcely present | Scarcely present | Scarcely present | Scarcely present | Scarcely present | Scarcely present | Scarcely present |

Bending strength and Young's modulus are measured using a test piece of 70×200 mm (according to JIS A 1408).

Elongation ratio through water absorption is an elongation ratio of a test piece before and after absorption of water caused by air conditioning the test piece at 60° C. for 3 days and then immersing it in water for 8 days to allow absorption of water.

Contraction ratio through moisture effusion is a contraction ratio of a test piece before and after moisture effusion caused by air conditioning the test piece at 20° C. under RH of 60% for 10 days and then drying it at 80° C. for 10 days to allow moisture effusion.

Microcracking test (cycle) means the number of cycles until cracks occur, wherein one cycle consists of a water absorption-drying procedure repeated 3 times in one week, said procedure consisting of carbonation for 4 days, water absorption for 7 hours and drying at 120° C. for 17 hours.

Freezing and fusion resistance is a percentage of expansion in thickness after 300 cycles according to ASTM C166-B method.

Nailing performance is determined by observing generation of cracks when two fiber reinforced cement products which are laid to overlap with each other by 30 mm according to the lap boarding are pegged with nails of 2.3 mm in diameter and 38 mm in length by means of a nailer gun at the positions of the overlapped part of the products 20 mm inside from the edges of the overlapped part in the longitudinal direction and in the shorter direction in compliance with actual installation.

The mark "◯" denotes no cracking and the mark "X" denotes generation of cracks.

The presence of crystalline silica was determined by appearance of the peaks observed in crystalline silica such as quartz, tridymite or cristobalite in an X-ray diffraction.

Example 1

The fiber reinforced cement product of Example 1, in which the amount of fly ash is 14% by mass and the amount of finely dividing fly ash is 42% by mass, has excellent physical properties such as bending strength, elongation ratio through water absorption, contraction ratio through moisture effusion, microcracking test, freezing and fusion resistance, nail performance.

Example 2

The fiber reinforced cement product of Example 2, in which the amount of fly ash is 28% by mass and the amount of finely dividing fly ash is 28% by mass, has excellent physical properties such as bending strength, elongation ratio through water absorption, contraction ratio through moisture effusion, microcracking test, freezing and fusion resistance, nail performance.

Example 3

The fiber reinforced cement product of Example 3, in which the amount of fly ash is 42% by mass and the amount of finely dividing fly ash is 14% by mass, has excellent physical properties such as bending strength, elongation ratio through water absorption, contraction ratio through moisture effusion, microcracking test, freezing and fusion resistance, nail performance.

Example 4

The fiber reinforced cement product of Example 4, in which the amount of expanded perlite is 14% by mass and the amount of finely dividing expanded perlite is 42% by mass, has excellent physical properties such as bending strength, elongation ratio through water absorption, contraction ratio through moisture effusion, microcracking test, freezing and fusion resistance, nail performance.

Example 5

The fiber reinforced cement product of Example 5, in which the amount of expanded perlite is 28% by mass and the amount of finely dividing expanded perlite is 28% by mass, has excellent physical properties such as bending strength, elongation ratio through water absorption, contraction ratio through moisture effusion, microcracking test, freezing and fusion resistance, nail performance.

Example 6

The fiber reinforced cement product of Example 6, in which the amount of fly ash is 14% by mass and the amount of finely dividing expanded perlite is 42% by mass, has excellent physical properties such as bending strength, elongation ratio through water absorption, contraction ratio through moisture effusion, microcracking test, freezing and fusion resistance, nail performance.

Example 7

The fiber reinforced cement product of Example 7, in which the amount of fly ash is 28% by mass and the amount of finely dividing expanded perlite is 28% by mass, has excellent physical properties such as bending strength, elongation ratio through water absorption, contraction ratio through moisture effusion, microcracking test, freezing and fusion resistance, nail performance.

Example 8

The fiber reinforced cement product of Example 8, in which the amount of fly ash is 42% by mass and the amount of finely dividing expanded perlite is 14% by mass, has excellent physical properties such as bending strength, elongation ratio through water absorption, contraction ratio through moisture effusion, microcracking test, freezing and fusion resistance, nail performance.

Example 9

The fiber reinforced cement product of Example 9, in which the amount of finely dividing fly ash is 42% by mass and the amount of expanded perlite is 14% by mass, has excellent physical properties such as bending strength, elongation ratio through water absorption, contraction ratio through moisture effusion, microcracking test, freezing and fusion resistance, nail performance.

Example 10

The fiber reinforced cement product of Example 10, in which the amount of finely dividing fly ash is 28% by mass and the amount of expanded perlite is 28% by mass, has excellent physical properties such as bending strength, elongation ratio through water absorption, contraction ratio through moisture effusion, microcracking test, freezing and fusion resistance, nail performance.

Example 11

The fiber reinforced cement product of Example 11, in which the amount of fly ash is 14% by mass and the amount of finely dividing shirasu balloon is 42% by mass, has excellent physical properties such as bending strength, elongation ratio through water absorption, contraction ratio through moisture effusion, microcracking test, freezing and fusion resistance, nail performance.

Example 12

The fiber reinforced cement product of Example 12, in which the amount of fly ash is 28% by mass and the amount of finely dividing shirasu balloon is 28% by mass, has excellent physical properties such as bending strength, elongation ratio through water absorption, contraction ratio through moisture effusion, microcracking test, freezing and fusion resistance, nail performance.

Example 13

The fiber reinforced cement product of Example 13, in which the amount of fly ash is 42% by mass and the amount of finely dividing shirasu balloon is 14% by mass, has excellent physical properties such as bending strength, elongation ratio through water absorption, contraction ratio through moisture effusion, microcracking test, freezing and fusion resistance, nail performance.

Example 14

The fiber reinforced cement product of Example 14, in which the amount of finely dividing fly ash is 42% by mass and the amount of shirasu balloon is 14% by mass, has excellent physical properties such as bending strength, elongation ratio through water absorption, contraction ratio through moisture effusion, microcracking test, freezing and fusion resistance, nail performance.

Example 15

The fiber reinforced cement product of Example 15, in which the amount of finely dividing fly ash is 28% by mass and the amount of shirasu balloon is 28% by mass, has excellent physical properties such as bending strength, elongation ratio through water absorption, contraction ratio through moisture effusion, microcracking test, freezing and fusion resistance, nail performance.

Example 16

The fiber reinforced cement product of Example 16, in which the amount of finely dividing fly ash is 28% by mass and the amount of fly ash is 14% by mass and the amount of expanded perlite is 14% by mass, has excellent physical properties such as bending strength, elongation ratio through water absorption, contraction ratio through moisture effusion, microcracking test, freezing and fusion resistance, nail performance.

Example 17

The fiber reinforced cement product of Example 17, in which the amount of finely dividing expanded perlite is 28% by mass and the amount of fly ash is 14% by mass and the amount of expanded perlite is 14% by mass, has excellent physical properties such as bending strength, elongation ratio through water absorption, contraction ratio through moisture effusion, microcracking test, freezing and fusion resistance, nail performance.

Table 3

Table 3 shows the compositions of the raw materials of Comparisons 1 to 15 in which the fiber reinforced cement products were manufactured by a process similar to that in the examples.

Table 4

Table 4 shows various physical properties of the fiber reinforced cement products of Comparisons 1 to 15 in which the fiber reinforced cement products were measured in a manner similar to that in the examples.

TABLE 3

| Raw material composition (% by mass) | Comparison 1 | Comparison 2 | Comparison 3 | Comparison 4 | Comparison 5 | Comparison 6 | Comparison 7 | Comparison 8 |
|---|---|---|---|---|---|---|---|---|
| Portland cement | 30 | 30 | 30 | 30 | 30 | 30 | 30 | 30 |
| Fly ash | 56 | 0 | 0 | 0 | 0 | 0 | 42 | 28 |
| Finely dividing fly ash | 0 | 56 | 0 | 0 | 0 | 0 | 0 | 0 |
| Expanded perlite | 0 | 0 | 56 | 0 | 0 | 0 | 14 | 28 |
| Finely dividing expanded perlite | 0 | 0 | 0 | 56 | 0 | 0 | 0 | 0 |
| shirasu balloon | 0 | 0 | 0 | 0 | 56 | 0 | 0 | 0 |

TABLE 3-continued

| | | | | | | | | |
|---|---|---|---|---|---|---|---|---|
| Finely dividing shirasu balloon | 0 | 0 | 0 | 0 | 0 | 56 | 0 | 0 |
| NUKP | 8 | 0 | 4 | 8 | 8 | 8 | 8 | 8 |
| NBKP | 0 | 8 | 4 | 0 | 0 | 0 | 0 | 0 |
| Used newspaper | 2 | 2 | 2 | 2 | 2 | 2 | 2 | 2 |
| Mica | 3 | 3 | 3 | 3 | 3 | 3 | 3 | 3 |
| Polyvinyl alcohol resin | 1 | 1 | 1 | 1 | 1 | 1 | 1 | 1 |

| Raw material composition (% by mass) | Comparison 9 | Comparison 10 | Comparison 11 | Comparison 12 | Comparison 13 | Comparison 14 | Comparison 15 |
|---|---|---|---|---|---|---|---|
| Portland cement | 30 | 30 | 30 | 30 | 30 | 30 | 30 |
| Fly ash | 14 | 42 | 28 | 14 | 0 | 0 | 0 |
| Finely dividing fly ash | 0 | 0 | 0 | 0 | 42 | 28 | 14 |
| Expanded perlite | 42 | 0 | 0 | 0 | 0 | 0 | 0 |
| Finely dividing expanded perlite | 0 | 0 | 0 | 0 | 14 | 28 | 42 |
| shirasu balloon | 0 | 14 | 28 | 42 | 0 | 0 | 0 |
| Finely dividing shirasu balloon | 0 | 0 | 0 | 0 | 0 | 0 | 0 |
| NUKP | 8 | 8 | 8 | 8 | 8 | 8 | 8 |
| NBKP | 0 | 0 | 0 | 0 | 0 | 0 | 0 |
| Used newspaper | 2 | 2 | 2 | 2 | 2 | 2 | 2 |
| Mica | 3 | 3 | 3 | 3 | 3 | 3 | 3 |
| Polyvinyl alcohol resin | 1 | 1 | 1 | 1 | 1 | 1 | 1 |

TABLE 4

| Physical property | Comparison 1 | Comparison 2 | Comparison 3 | Comparison 4 | Comparison 5 | Comparison 6 | Comparison 7 | Comparison 8 |
|---|---|---|---|---|---|---|---|---|
| Absolute dry specific gravity | 1.09 | 1.35 | 1.11 | 1.39 | 1.12 | 1.42 | 1.09 | 1.10 |
| Young's modulus (kN/mm$^2$) | 3.1 | 10.6 | 3.4 | 11.5 | 3.5 | 11.9 | 3.2 | 3.2 |
| Bending strength (N/mm$^2$) | 12.3 | 24.1 | 12.6 | 26.0 | 12.8 | 26.5 | 12.4 | 12.5 |
| Elongation ratio through water absorption (%) | 0.18 | 0.08 | 0.18 | 0.08 | 0.18 | 0.08 | 0.18 | 0.18 |
| Contraction ratio through moisture effusion (%) | 0.21 | 0.09 | 0.20 | 0.09 | 0.20 | 0.08 | 0.21 | 0.20 |
| Microcracking test (cycle) | 10 | 4 | 10 | 3 | 10 | 2 | 10 | 10 |
| Freezing and fusion resistance (%) | 7.7 | 0.3 | 7.3 | 0.3 | 7.0 | 0.3 | 7.6 | 7.5 |
| Nail performance | ○ | X | ○ | X | ○ | X | ○ | ○ |
| Presence or absence of crystalline silica | present | Scarcely present | Not present | Not present | Scarcely present | Scarcely present | Scarcely present | Scarcely present |

| Physical property | Comparison 9 | Comparison 10 | Comparison 11 | Comparison 12 | Comparison 13 | Comparison 14 | Comparison 15 |
|---|---|---|---|---|---|---|---|
| Absolute dry specific gravity | 1.11 | 1.10 | 1.11 | 1.12 | 1.36 | 1.37 | 1.38 |
| Young's modulus (kN/mm$^2$) | 3.3 | 3.2 | 3.3 | 3.4 | 10.8 | 11.0 | 11.3 |
| Bending strength (N/mm$^2$) | 12.6 | 12.5 | 12.6 | 12.7 | 24.4 | 25.0 | 25.7 |
| Elongation ratio through water absorption (%) | 0.18 | 0.18 | 0.18 | 0.18 | 0.08 | 0.08 | 0.08 |
| Contraction ratio through moisture effusion (%) | 0.20 | 0.20 | 0.20 | 0.20 | 0.09 | 0.09 | 0.09 |
| Microcracking test (cycle) | 10 | 10 | 10 | 10 | 4 | 4 | 3 |
| Freezing and fusion resistance (%) | 7.4 | 7.5 | 7.4 | 7.2 | 0.3 | 0.3 | 0.3 |
| Nail performance | ○ | ○ | ○ | ○ | X | X | X |
| Presence or absence of crystalline silica | Scarcely present | Scarcely present | Scarcely present | Scarcely present | Scarcely present | Scarcely present | Scarcely present |

Comparison 1

The fiber reinforced cement product of Comparison 1, in which siliceous material is only fly ash and the amount of fly ash is 56% by mass, has a low absolute dry specific gravity, and has poor physical properties such as bending strength, elongation ratio through water absorption, contraction ratio through moisture effusion, freezing and fusion resistance.

Comparison 2

The fiber reinforced cement product of Comparison 2, in which siliceous material is only finely dividing fly ash and the amount of finely dividing fly ash is 56% by mass, has poor physical properties such as microcracking test, nail performance, and product is hard and fragile.

Comparison 3

The fiber reinforced cement product of Comparison 3, in which siliceous material is only expanded perlite and the amount of expanded perlite is 56% by mass, has a low absolute dry specific gravity, and has poor physical properties such as bending strength, elongation ratio through water absorption, contraction ratio through moisture effusion, freezing and fusion resistance.

Comparison 4

The fiber reinforced cement product of Comparison 4, in which siliceous material is only finely dividing expanded perlite and the amount of finely dividing expanded perlite is 56% by mass, has poor physical properties such as microcracking test, nail performance, and product is hard and fragile.

Comparison 5

The fiber reinforced cement product of Comparison 5, in which siliceous material is only shirasu balloon and the amount of shirasu balloon is 56% by mass, has a low absolute dry specific gravity, and has poor physical properties such as bending strength, elongation ratio through water absorption, contraction ratio through moisture effusion, freezing and fusion resistance.

Comparison 6

The fiber reinforced cement product of Comparison 6 in which siliceous materials is only finely dividing shirasu balloon and the amount of finely dividing shirasu balloon is 56% by mass, has poor physical properties such as microcracking test, nail performance, and product is hard and fragile.

Comparison 7

The fiber reinforced cement product of Comparison 7, in which siliceous materials are fly ash and expanded perlite, the amount of fly ash is 42% by mass and the amount of expanded perlite is 14% by mass, has a low absolute dry specific gravity, and has poor physical properties such as bending strength, elongation ratio through water absorption, contraction ratio through moisture effusion, freezing and fusion resistance.

Comparison 8

The fiber reinforced cement product of Comparison 8, in which siliceous materials are fly ash and expanded perlite, the amount of fly ash is 28% by mass and the amount of expanded perlite is 28% by mass, has a low absolute dry specific gravity, and has poor physical properties such as bending strength, elongation ratio through water absorption, contraction ratio through moisture effusion, freezing and fusion resistance.

Comparison 9

The fiber reinforced cement product of Comparison 9, in which siliceous materials are fly ash and expanded perlite, the amount of fly ash is 14% by mass and the amount of expanded perlite is 42% by mass, has a low absolute dry specific gravity, and has poor physical properties such as bending strength, elongation ratio through water absorption, contraction ratio through moisture effusion, freezing and fusion resistance.

Comparison 10

The fiber reinforced cement product of Comparison 10, in which siliceous materials are fly ash and shirasu balloon, the amount of fly ash is 42% by mass and the amount of shirsu balloon is 14% by mass, has a low absolute dry specific gravity, and has poor physical properties such as bending strength, elongation ratio through water absorption, contraction ratio through moisture effusion, freezing and fusion resistance.

Comparison 11

The fiber reinforced cement product of Comparison 11, in which siliceous materials are fly ash and shirsu balloon, the amount of fly ash is 28% by mass and the amount of shirasu balloon is 28% by mass, has a low absolute dry specific gravity, and has poor physical properties such as bending strength, elongation ratio through water absorption, contraction ratio through moisture effusion, freezing and fusion resistance.

Comparison 12

The fiber reinforced cement product of Comparison 12, in which siliceous materials are fly ash and shirasu balloon, the amount of fly ash is 14% by mass and the amount of shirasu balloon is 42% by mass, has a low absolute dry specific gravity, and has poor physical properties such as bending strength, elongation ratio through water absorption, contraction ratio through moisture effusion, freezing and fusion resistance.

Comparison 13

The fiber reinforced cement product of Comparison 13, in which siliceous materials are finely dividing fly ash and finely dividing expanded perlite, the amount of finely dividing fly ash is 42% by mass and the amount of finely dividing expanded perlite is 14% by mass, has poor physical properties such as microcracking test, nail performance, and product is hard and fragile.

Comparison 14

The fiber reinforced cement product of Comparison 14, in which siliceous materials are finely dividing fly ash and finely dividing expanded perlite, the amount of finely dividing fly ash is 28% by mass and the amount of finely dividing expanded perlite is 28% by mass, has poor physical properties such as microcracking test, nail performance, and product is hard and fragile.

Comparison 15

The fiber reinforced cement product of Comparison 15, in which siliceous materials are finely dividing fly ash and finely dividing expanded perlite, the amount of finely dividing fly ash is 14% by mass and the amount of finely dividing expanded perlite is 42% by mass, has poor physical properties such as microcracking test, nail performance, and product is hard and fragile.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure.

The limitations in the claims are to be interpreted broadly based on the language employed in the claims and not limited to examples described in the present specification or during the prosecution of the application, which examples are to be construed as non-exclusive. For example, in the present disclosure, the term "preferable" is non-exclusive and means "preferable, but not limited to".

In this disclosure and during the prosecution of this application, the terminology "present invention" or "invention" is meant as non-specific, general reference and may be used as a reference to one or more aspect within the present disclosure.

The language present invention or invention should not be improperly interpreted as an identification of criticality, should not be improperly interpreted as applying across all aspects or embodiments (i.e., it should be understood that the present invention has a number of aspects and embodiments) and should not be improperly interpreted as limiting the scope of the application or claims.

In this disclosure and during the prosecution of this application, the terminology embodiment can be used to describe any aspect, feature, process or step, any combination thereof, and/or any portion thereof, etc. In some examples, various embodiments may include overlapping features.

What is claimed is:

1. A fiber reinforced cement composition comprising the following raw materials:
   a hydraulic inorganic material;
   a siliceous material;
   a woody reinforcement;
   mica; and
   polyvinyl alcohol resin, wherein
   the siliceous material comprises an inorganic hollow material having average particle size of 50-300 μm and/or an inorganic spherical material having average particle size of 15-50 μm and a inorganic material having average particle size of 1-15 μm,
   the inorganic hollow material having average particle size of 50-300 μm comprises at least one material selected from the group consisting of fly ash, expanded perlite and shirasu balloon,
   the inorganic spherical material having average particle size of 15-50 μm comprises at least one material selected from the group consisting of fly ash and shirasu balloon,
   the inorganic material having average particle size of 1-15 μm comprises at least one material selected from the group consisting of fly ash, expanded perlite and shirasu balloon, and
   the woody reinforcement comprises needle-leaves-tree unbleached kraft pulp and/or needle-leaves-tree bleached kraft pulp and used newspaper.

2. The fiber reinforced cement composition according to claim 1, wherein the inorganic hollow material having average particle size of 50-300 μm is expanded perlite and the inorganic spherical material having average particle size of 15-50 μm is fly ash.

3. The fiber reinforced cement composition according to claim 1, wherein the hydraulic inorganic material is a portland cement.

4. The fiber reinforced cement composition according to claim 1, wherein the woody reinforcement is a mixture of the needle-leaves-tree unbleached kraft pulp and/or the needle-leaves-tree bleached kraft pulp and used newspaper in a ratio of the needle-leaves-tree unbleached kraft pulp and/or the needle-leaves-tree bleached kraft pulp to the used newspaper in a range of from 1:1 to 4:1.

5. A fiber reinforced cement composition comprising the following raw materials:
   not less than 25% by mass and not more than 45% by mass of a hydraulic inorganic material;
   not less than 5% by mass and not more than 12% by mass of a woody reinforcement;
   not less than 50% by mass and not more than 65% by mass of a siliceous material;
   not less than 1% by mass and not more than 7% by mass of mica; and
   not less than 0.25% by mass and not more than 1.5% by mass of polyvinyl alcohol resin, wherein
   the siliceous material comprises an inorganic hollow material having average particle size of 50-300 μm and/or an inorganic spherical material having average particle size of 15-50 μm and a inorganic material having average particle size of 1-15 μm,
   the inorganic hollow material having average particle size of 50-300 μm comprises at least one material selected from the group consisting of fly ash, expanded perlite and shirasu balloon,
   the inorganic spherical material having average particle size of 15-50 μm comprises at least one material selected from the group consisting of fly ash and shirasu balloon,
   the inorganic material having average particle size of 1-15 μm comprises at least one material selected from the group consisting of fly ash, expanded perlite and shirasu balloon,
   the inorganic material having average particle size of 1-15 μm is contained in the amount of not less than 25% by mass and not more than 75% by mass of whole siliceous material consisting of the inorganic hollow material having average particle size of 50-300 μm and/or the inorganic spherical material having average particle size of 15-50 μm and the inorganic material having average particle size of 1-15 μm, and
   the woody reinforcement comprises needle-leaves-tree unbleached kraft pulp and/or needle-leaves-tree bleached kraft pulp and used newspaper.

6. The fiber reinforced cement composition according to claim 5, wherein
   the hydraulic inorganic material is a portland cement,
   the woody reinforcement is a mixture of the needle-leaves-tree unbleached kraft pulp and/or the needle-leaves-tree bleached kraft pulp and used newspaper in a ratio of the needle-leaves-tree unbleached kraft pulp and/or the needle-leaves-tree bleached kraft pulp to the used newspaper in a range of from 1:1 to 4:1, and
   the inorganic hollow material having average particle size of 50-300 μm is expanded perlite and the inorganic spherical material having average particle size of 15-50 μm is fly ash.

7. A fiber reinforced cement product manufactured from the fiber reinforced cement composition according to claim 5.

8. A fiber reinforced cement product manufactured from the fiber reinforced cement composition according to claim 6.

9. A fiber reinforced cement product manufactured from the fiber reinforced cement composition according to claim 1.

10. A fiber reinforced cement product manufactured from the fiber reinforced cement composition according to claim 2.

11. A fiber reinforced cement product manufactured from the fiber reinforced cement composition according to claim 3.

12. A fiber reinforced cement product manufactured from the fiber reinforced cement composition according to claim 4.

13. A process for manufacturing a fiber reinforced cement product comprising the steps of:
    dispersing in water a raw material composition comprising as main raw materials:
    a hydraulic inorganic material;
    a siliceous material;
    a woody reinforcement;
    mica; and
    polyvinyl alcohol resin, wherein
    the siliceous material comprises an inorganic hollow material having average particle size of 50-300 μm and/or an inorganic spherical material having average particle size of 15-50 μm and a inorganic material having average particle size of 1-15 μm,
    the inorganic hollow material having average particle size of 50-300 μm comprises at least one material selected from the group consisting of fly ash, expanded perlite and shirasu balloon,
    the inorganic spherical material having average particle size of 15-50 μm comprises at least one material selected from the group consisting of fly ash and shirasu balloon,
    the inorganic material having particle size of 1-15 μm comprises at least one material selected from the group consisting of fly ash, expanded perlite and shirasu balloon, and the woody reinforcement comprises needle-leaves-tree unbleached kraft pulp and/or needle-leaves-tree bleached kraft pulp and used newspaper, so as to give a slurry of the raw materials;

forming a green mat from the slurry; and pressing the green mat by press molding and thereafter curing the mat in an autoclave.

14. The process for manufacturing the fiber reinforced cement product according to claim 13, wherein the inorganic hollow material is expanded perlite and the inorganic spherical material is fly ash.

15. The process for manufacturing the fiber reinforced cement product according to claim 13, wherein the hydraulic inorganic material is a portland cement.

16. The process for manufacturing the fiber reinforced cement product according to claim 13, wherein the woody reinforcement is a mixture of the needle-leaves-tree unbleached kraft pulp and/or the needle-leaves-tree bleached kraft pulp and used newspaper in a ratio of the needle-leaves-tree unbleached kraft pulp and/or the needle-leaves-tree bleached kraft pulp to the used newspaper in a range of from 1:1 to 4:1.

17. A process for manufacturing a fiber reinforced cement product comprising the steps of:

dispersing in water a raw material composition comprising as main raw materials:

not less than 25% by mass and not more than 45% by mass of a hydraulic inorganic material;

not less than 5% by mass and not more than 12% by mass of a woody reinforcement;

not less than 50% by mass and not more than 65% by mass of a siliceous material;

not less than 1% by mass and not more than 7% by mass of mica; and not less than 0.25% by mass and not more than 1.5% by mass of polyvinyl alcohol resin, wherein the siliceous material comprises an inorganic hollow material having average particle size of 50-300 μm and/or an inorganic spherical material having average particle size of 15-50 μm and a inorganic material having average particle size of 1-15 μm, the inorganic hollow material having average particle size of 50-300 μm comprises at least one material selected from the group consisting of fly ash, expanded perlite and shirasu balloon, the inorganic spherical material having average particle size of 15-50 μm comprises at least one material selected from the group consisting of fly ash and shirasu balloon, the inorganic material having average particle size of 1-15 μm comprises at least one material selected from the group consisting of fly ash, expanded perlite and shirasu balloon, the inorganic material having average particle size of 1-15 μm is contained in the amount of not less than 25% by mass and not more than 75% by mass of whole siliceous material consisting of the inorganic hollow material having average particle size of 50-300 μm and/or the inorganic spherical material having average particle size of 15-50 μm and the inorganic material having average particle size of 1-15 μm, the woody reinforcement comprises needle-leaves-tree unbleached kraft pulp and/or needle-leaves-tree bleached kraft pulp and used newspaper, so as to give a slurry of the raw materials;

forming a green mat from the slurry; and pressing the green mat by press molding and thereafter curing the mat in an autoclave.

18. The process for manufacturing a fiber reinforced cement product according to claim 17, wherein the hydraulic inorganic material is a portland cement, the woody reinforcement is a mixture of the needle-leaves-tree unbleached kraft pulp and/or the needle-leaves-tree bleached kraft pulp and used newspaper in a ratio of the needle-leaves-tree unbleached kraft pulp and/or the needle-leaves-tree bleached kraft pulp to the used newspaper in a range of from 1:1 to 4:1, and the inorganic hollow material is expanded perlite and the inorganic spherical material is fly ash.

\* \* \* \* \*